Dec. 11, 1928.
L. C. BLACK
WELL DRILLING TOOL
Filed Oct. 20, 1924
1,694,679
2 Sheets-Sheet 1
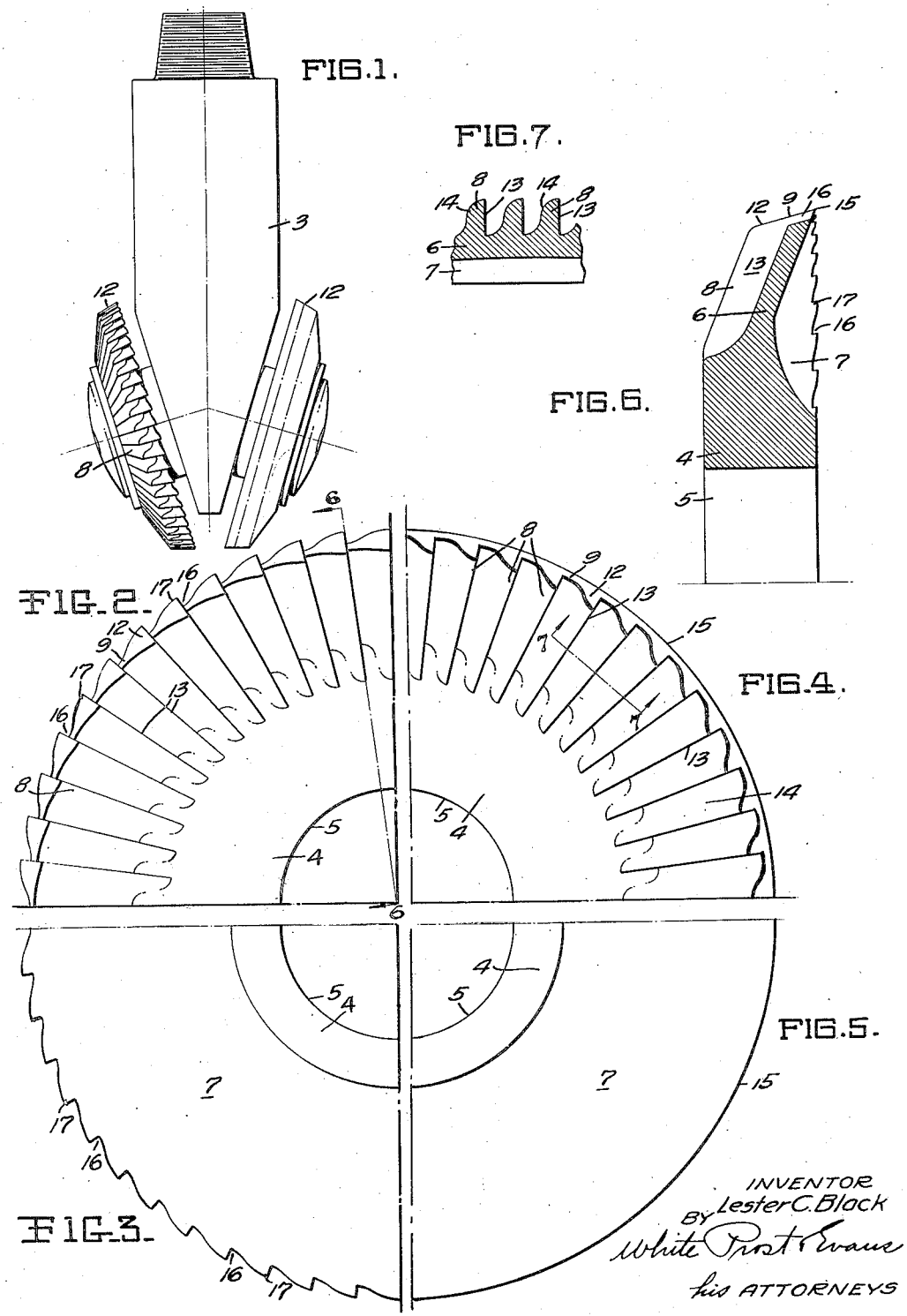
INVENTOR
Lester C. Black
BY
his ATTORNEYS

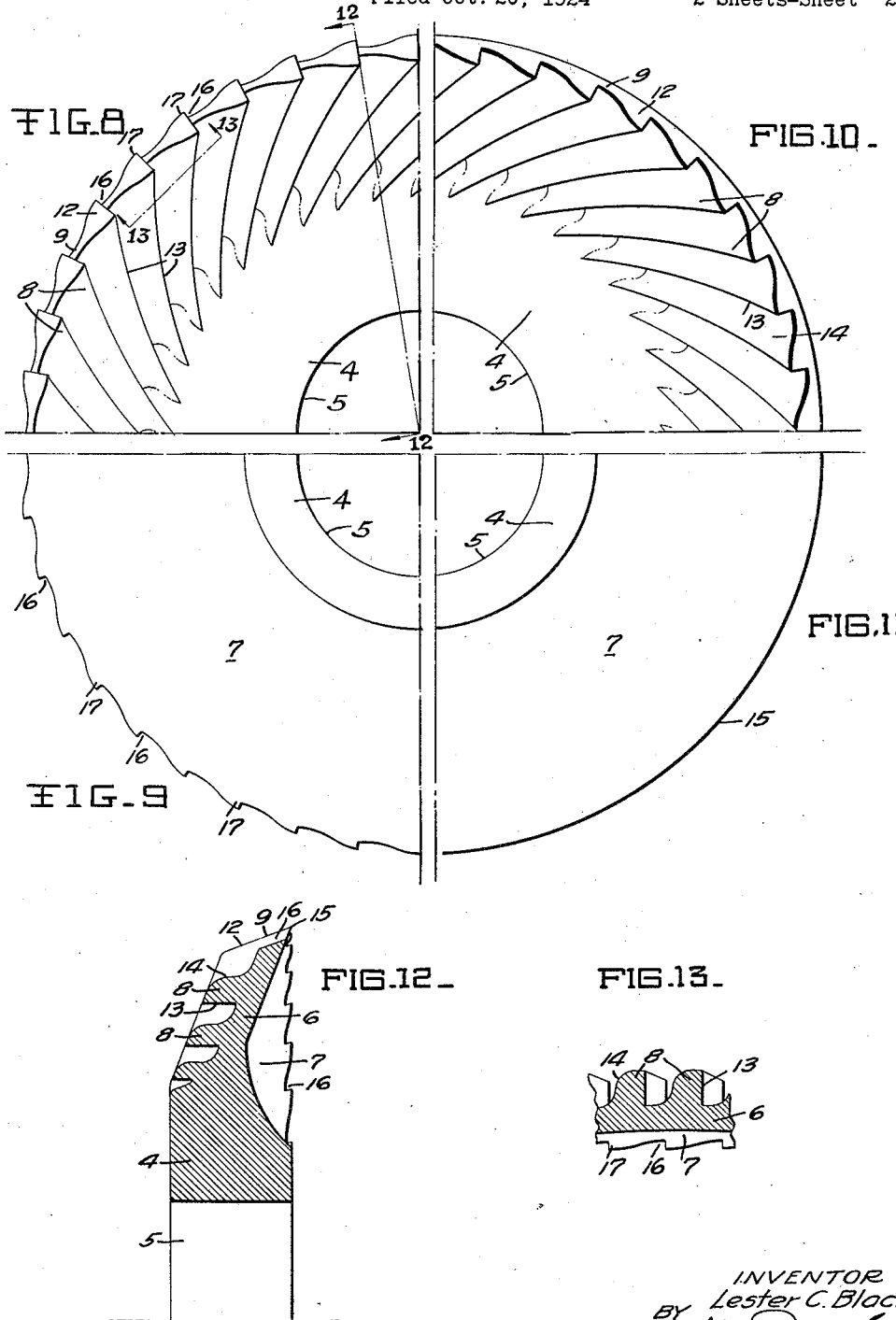

Patented Dec. 11, 1928.

1,694,679

UNITED STATES PATENT OFFICE.

LESTER C. BLACK, OF LOS ANGELES, CALIFORNIA.

WELL-DRILLING TOOL.

Application filed October 20, 1924. Serial No. 744,565.

The invention relates to well drilling tools and particularly to rotary cutting discs which are employed in connection with rotary boring drills. These discs are provided with sharp cutting edges that shear off the material from the side of the hole being drilled.

An object of the invention is to provide a self-sharpening rotary disc cutter, the cutting edge being maintained sharp by the abrasion against the formation being cut.

Another object of the invention is to provide a rotary cutting disc having a toothed or fluted cutting edge, which will be maintained as the cutting edge wears away.

Another object of the invention is to provide a rotary cutting disc in which the teeth on the cutting edge are maintained sharp as the cutting edge is worn away by abrasion against the formation being cut.

The invention possesses other advantageous features, some of which with the foregoing, will be set forth at length in the following description, where I shall outline in full several forms of cutting discs embodying my invention, which I have selected for illustration in the drawings accompanying and forming part of the present specification. In said drawings I have shown two forms of cutting discs embodying my invention, but it is to be understood that I do not limit myself to said forms, since the invention, as set forth in the claims, may be embodied in a plurality of other forms.

Referring to said drawings:

Figure 1 is an elevation of one form of rotary drilling tool, showing the cutting discs of my invention arranged thereon.

Fig. 2 is a rear elevational view of one quarter of a cutting disc embodying my invention, the drawing showing the disc having a jagged contour as is formed after the device has been in use.

Fig. 3 is a front elevational view of one-quarter of a cutting disc embodying my invention, the periphery of the disc being shown as in Fig. 2.

Fig. 4 is a view similar to Fig. 2, but showing the disc having a smooth contour as it is formed before the disc has been in use.

Fig. 5 is a view similar to Fig. 3, but showing the disc with a smooth contour as in Fig. 4.

Fig. 6 is a cross section thru one-half of the disc taken along the line 6—6 of Fig. 2.

Fig. 7 is a section of the disc taken along the line 7—7 of Fig. 4.

Fig. 8 is a rear elevational view of one-quarter of a modified form of disc, the periphery of the disc being shown as jagged or toothed as it is formed after the disc has been in use.

Fig. 9 is a rear elevational view of the disc as shown in Fig. 8.

Fig. 10 is a view similar to Fig. 8, but showing the disc having a smooth contour as it is formed before the disc has been in use.

Fig. 11 is a rear elevational view of the disc as shown in Fig. 10.

Fig. 12 is a cross section of the disc as taken along the line 12—12 of Fig. 8.

Fig. 13 is a cross section taken along the line 13—13 of Fig. 8.

Rotary cutting discs have gone into extended use in oil well drilling operations. The discs are mounted for rotation about their axes on a stem or bit, which is rotated about a vertical axis, so that the discs roll around in the hole being drilled, the cutting edges of the discs serving to shear off the material from the side of the hole. These discs are mounted on the rotary stem or bit in many different ways and at many different angles. In some constructions, the discs are vertical; in other constructions the discs incline toward each other at their lower ends and in other constructions the discs incline toward each other at their upper ends. Sometimes the discs are arranged on the outside of the stem, as shown in Figure 1, and sometimes the stem is forked and the discs are arranged on the inside of the legs of the forks. The present invention relates to the cutting disc per se and not to its mounting on the drilling stem and the discs of my invention may be used in connection with any standard or suitable form of drilling stem.

In Figure 1 I have shown the discs of my invention rotatably mounted on the lower end of the rotary drill stem 3, the discs being inclined toward each other at their lower edges. As the stem 3 is rotated, the discs are rotated about their axes and roll around the hole being formed, shearing the material from the sides of the hole. These discs are subjected to every severe abrasion, so that the cutting edges of the discs are rapidly worn away. An object of the present invention, therefore, is to provide a cutting disc in which the cutting edge is maintained by abrasion against the formation.

The disc of my invention is preferably made of manganese steel or similar material, so that the wear of the cutting edge is reduced to a minimum. The disc is provided with a body portion 4 having a central bore 5 therein to receive the axle or shaft about which the disc rotates. Springing from the body portion 4 is an annular marginal portion 6 which is narrower than the body portion and which is preferably inclined forward, so that the surface of the marginal portion lies at an angle to the surface normal to the axis of rotation of the disc. The body 4 is preferably recessed on its front surface 7 and the marginal portion 6 springs from the base of the recess and inclines forwardly. At the marginal portion, the disc is provided on its rear surface with a plurality of ribs or ridges 8, the ribs extending from the body portion to the circumference 9 of the disc. These ribs 8 may be radial, as shown in Figure 2, or they may be helical as shown in Figure 6, or may be otherwise disposed, extending from the inner circumference to the outer periphery of the marginal portion 6. The spacing and size of the ribs will depend upon the nature of the formation to be cut, since it appears that small ribs, closely set together, will be more effective in cutting a hard formation than large ribs spaced apart a considerable distance. The ribs 8 extend outward to the circumference 9, and the end face 12 of each rib preferably terminates in the surface of a cone concentric to the axis of rotation of the disk, which surface also includes the circumference of the marginal portion 6. The ribs 8 are preferably of uniform height from the circumference of the portion 6 to the body portion and, the marginal portion 6 is preferably of uniform thickness, so that as the peripheral surface 9 wears away, the relation between the marginal portion 6 and the ribs 8 is maintained. The peripheral surface 9 is preferably inclined to the axis of rotation of the discs and the degree of inclination will vary with the inclination of the axis of rotation of the discs. The ribs 8 are preferably formed with one side face 13 normal to the marginal portion at the base of the rib. The other face 14 of each rib preferably comprises a reversely curved surface, forming substantially a right angle with the outer edge of the side 13 of one rib and with the inner edge of the side 13 of the adjacent rib. The ribs are preferably of a lesser thickness than one-half the rib pitch, so that a channel is formed between each two successive ribs.

The disc is preferably cast with a smooth peripheral surface, that is, the surface 9 and the end surfaces 12 of the ribs 8 being continuous. The front edge 15 of the peripheral surface is a smooth unbroken circular line. When the disc is used, the abrasion against the formation being cut, causes greater wear of the peripheral surface at the spaces lying between the ribs than at the ribs, so that the peripheral surface becomes indented, there being formed a series of indentures 16 separated by teeth 17 which extend radially from the circumference. The teeth 17 are coincident with the ribs 8 and the recession of the peripheral surface at the teeth 17 is slower than at the spaces between the teeth, due to the greater thickness of the peripheral surface due to the extension of the ribs into the peripheral surface. After the indentions 16 have been worn to a predetermined depth, they are subjected to lesser abrasive action than the surfaces of the teeth 17 and the end faces 12 of the ribs, so that the recession of the depressions 16 and the teeth 17 is equal, thereby maintaining a toothed peripheral surface, as the surface is worn away by abrasion. The circumference is therefore provided with radially extending teeth and with teeth integral with the radially extending teeth 17 which extend backward on the rear face of the marginal portion 6. These teeth are maintained by the abrasion of the peripheral surface against the formation, so that a self-maintaining, self-sharpening toothed cutting disc is provided.

For drilling in different formations, cutting edges of different contours are desirable to produce optimum results, and the contour of the cutting edge, that is, the size, spacing and shape of the teeth can be varied in different discs, by varying the size or shape or spacing or angle of the ribs on the rear of the disc.

I claim:

1. A self sharpening rotary cutter for boring drills comprising a disc having an annular marginal portion inclined to a plane normal to the axis of rotation of the disc, a circumferential contact surface, a plurality of spaced ribs on the rear surface of the marginal portion extending across the marginal portion to said contact surface and causing said surface to have a toothed rear edge, one side of each rib being substantially perpendicular to the plane of the marginal portion.

2. A self sharpening rotary cutter for earth drills comprising a disc having an annular marginal portion, a circumferential contact surface, a plurality of spaced ribs on the rear face of the marginal portion extending across the marginal portion to said contact surface and causing said contact surface to have a toothed rear edge, one side of each rib being substantially perpendicular to the adjacent face of the marginal portion.

3. A self sharpening rotary cutter for boring drills comprising a disc having a circumference lying in a conical surface, spaced ribs on the rear face of the disc extending across the rear face of the disc to said surface, the outer ends of the ribs lying in said surface and the rear edges of the ribs being inclined to the axis of rotation and to the peripheral surface, one side of each rib being substantially perpendicular to the plane of the disc at the base of the rib.

4. A self-sharpening rotary cutter comprising an annular body, a plurality of teeth extending outwardly and equally spaced about the circumference of said body, said teeth being disposed so as to bear at their outer ends on the material being drilled, and an annular flange joining together said teeth and offering less resistance to wear on its outer periphery at points between said teeth than at points adjacent said teeth, said flange being of substantially the same thickness for a substantial distance inward from said periphery.

5. A self-sharpening rotary cutter comprising an annular body portion, a plurality of spaced tapered teeth extending outwardly from said portion and adapted to bear at their outer ends upon the material being drilled, the advancing faces of said teeth being normal to a plane at right angles to the axis of revolution of said disc, and an annular flange joining together said teeth and offering less resistance to wear on its outer periphery at points between said advancing faces than at points adjacent said advancing faces.

6. A self-sharpening rotary cutter for a drill comprising an annular body, an annular marginal portion extending from said body, said marginal portion being of substantially uniform thickness for a substantial distance from the circumference of said portion as measured in a direction parallel to the axis of revolution of said cutter, and a plurality of spaced ribs on one face of said portion, said ribs extending inwardly a substantial distance from the circumference of said portion, whereby in use the circumference of said portion will maintain the form of a toothed periphery as it wears away.

7. A self sharpening rotary cutter comprising an annular body portion, a plurality of teeth extending outwardly from the body portion and adapted to bear at their outer ends upon the material being drilled, an annular flange integrally joining togther said teeth and offering less resistance to wear at points between said teeth than the end faces of said teeth, said flange being of substantially the same thickness for a substantial distance inwardly from its outer periphery.

In testimony whereof, I have hereunto set my hand.

LESTER C. BLACK.